US011856032B2

(12) United States Patent
Viswanathan et al.

(10) Patent No.: US 11,856,032 B2
(45) Date of Patent: *Dec. 26, 2023

(54) POLICY-BASED SECURE CONTAINERS FOR MULTIPLE ENTERPRISE APPLICATIONS

(71) Applicant: Intel Corporation, Santa Clara, CA (US)

(72) Inventors: Tarun Viswanathan, El Dorado Hills, CA (US); Uri Kahana, Givat-Ada (IL); Alan Ross, Shingle Springs, CA (US); Eran Birk, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/481,215

(22) Filed: Sep. 21, 2021

(65) Prior Publication Data
US 2022/0217181 A1 Jul. 7, 2022

Related U.S. Application Data

(63) Continuation of application No. 16/567,504, filed on Sep. 11, 2019, now Pat. No. 11,252,198, which is a (Continued)

(51) Int. Cl.
*H04L 9/40* (2022.01)

(52) U.S. Cl.
CPC ............ *H04L 63/205* (2013.01); *H04L 63/08* (2013.01); *H04L 63/105* (2013.01)

(58) Field of Classification Search
CPC ...... H04L 63/205; H04L 63/08; H04L 63/105
See application file for complete search history.

(56) References Cited

U.S. PATENT DOCUMENTS 7,069,447 B1 * 6/2006 Corder .................... G06F 21/80
 713/168
7,496,762 B1 * 2/2009 Boydstun ................ H04L 63/30
 713/182

(Continued)

OTHER PUBLICATIONS

United States Patent and Trademark Office, "Non-Final Rejection", issued in connection with U.S. Appl. No. 13/729,586, dated Oct. 3, 2014, 31 pages.

(Continued)

*Primary Examiner* — Abiy Getachew
(74) *Attorney, Agent, or Firm* — HANLEY, FLIGHT & ZIMMERMAN, LLC

(57) ABSTRACT

Technologies for providing policy-based secure containers for multiple enterprise applications include a client computing device and an enterprise policy server. The client computing device sends device attribute information and a request for access to an enterprise application to the enterprise policy server. The enterprise policy server determines a device trust level based on the device attribute information and a data sensitivity level based on the enterprise application, and sends a security policy to the client computing device based on the device trust level and the data sensitivity level. The client computing device references or creates a secure container for the security policy, adds the enterprise application to the secure container, and enforces the security policy while executing the enterprise application in the secure container. Multiple enterprise applications may be added to each secure container. Other embodiments are described and claimed.

25 Claims, 5 Drawing Sheets

Related U.S. Application Data continuation of application No. 16/168,273, filed on Oct. 23, 2018, now Pat. No. 10,511,638, which is a continuation of application No. 15/051,130, filed on Feb. 23, 2016, now Pat. No. 10,122,766, which is a continuation of application No. 13/729,586, filed on Dec. 28, 2012, now Pat. No. 9,276,963.

(56) References Cited

U.S. PATENT DOCUMENTS

| | | | |
|---|---|---|---|
| 9,276,963 | B2 | 3/2016 | Viswanathan et al. |
| 10,122,766 | B2 | 11/2018 | Viswanathan et al. |
| 10,511,638 | B2 | 12/2019 | Viswanathan et al. |
| 11,252,198 | B2 | 2/2022 | Viswanathan et al. |
| 2003/0145222 | A1* | 7/2003 | Gittler ............... G06F 21/62 726/17 |
| 2010/0121893 | A1* | 5/2010 | Uhrhane ............ G06F 21/6218 711/170 |
| 2010/0262706 | A1* | 10/2010 | Rodriguez ............ H04L 63/101 709/229 |
| 2011/0202598 | A1* | 8/2011 | Evans ................... H04L 51/23 709/203 |
| 2011/0311049 | A1 | 12/2011 | Amaudruz et al. |
| 2013/0074142 | A1* | 3/2013 | Brennan ............ G06F 21/6245 726/1 |
| 2014/0115693 | A1 | 4/2014 | Schieman et al. |
| 2014/0189777 | A1* | 7/2014 | Viswanathan ........ H04L 63/105 726/1 |
| 2014/0297840 | A1 | 10/2014 | Qureshi |
| 2018/0198742 | A1* | 7/2018 | Subramani ............ G06F 40/274 |

OTHER PUBLICATIONS

United States Patent and Trademark Office, "Final Rejection", issued in connection with U.S. Appl. No. 13/729,586, dated Apr. 30, 2015, 28 pages.

United States Patent and Trademark Office, "Advisory Action", issued in connection with U.S. Appl. No. 13/729,586, dated Aug. 12, 2015, 3 pages.

United States Patent and Trademark Office, "Notice of Allowance and Fee(s) Due", issued in connection with U.S. Appl. No. 13/729,586, dated Sep. 25, 2015, 9 pages.

United States Patent and Trademark Office, "Non-Final Rejection", issued in connection with U.S. Appl. No. 15/051,130, dated Dec. 16, 2016, 28 pages.

United States Patent and Trademark Office, "Final-Rejection", issued in connection with U.S. Appl. No. 15/051,130, dated Jul. 28, 2017, 26 pages.

United States Patent and Trademark Office, "Non-Final Rejection", issued in connection with U.S. Appl. No. 15/051,130, dated Jan. 17, 2018, 30 pages.

United States Patent and Trademark Office, "Notice of Allowance and Fee(s) Due", issued in connection with U.S. Appl. No. 15/051,130, dated Jul. 11, 2018, 8 pages.

United States Patent and Trademark Office, "Non-Final Rejection", issued in connection with U.S. Appl. No. 16/168,273, dated May 17, 2019, 27 pages.

United States Patent and Trademark Office, "Notice of Allowance and Fee(s) Due", issued in connection with U.S. Appl. No. 16/168,273, dated Aug. 21, 2019, 8 pages.

Lennon, "Mocana Adds Features To 'Self Defending' Mobile App Protection Solution," available from: <http://www.securityweek.com/mocana-adds-features-self-defending-mobile-app-protection-solution>, Dec. 4, 2012, 3 pages.

Wikipedia, "Mobile application management," The Free Encyclopedia, retrieved from: <http://en.wikipedia.org/w/index.php?title=Mobile_application_management&oldid=508596774>, edited Aug. 22, 2012, 3 pages.

Madden, "App 'wrapping' with Mocana Mobile App Protection," available from: <http://www.brianmadden.com/blogs/jackmadden/archive/2012/06/08/app-wrapping-with-mocana-mobile-app-protection.aspx>, Jun. 8, 2012, 2 pages.

United States Patent and Trademark Office, "Notice of Allowance and Fee(s) Due", issued in connection with U.S. Appl. No. 16/567,504, dated Oct. 4, 2021, 12 pages.

United States Patent and Trademark Office, "Final Rejection", issued in connection with U.S. Appl. No. 16/567,504, dated Mar. 22, 2021, 13 pages.

United States Patent and Trademark Office, "Non-Final Rejection", issued in connection with U.S. Appl. No. 16/567,504, dated Oct. 28, 2020, 32 pages.

\* cited by examiner

POLICY-BASED SECURE CONTAINERS FOR MULTIPLE ENTERPRISE APPLICATIONS

CROSS-REFERENCE TO RELATED APPLICATION

This patent arises from a continuation of U.S. patent application Ser. No. 16/567,504, entitled "Policy-Based Secure Containers for Multiple Enterprise Applications," (now U.S. Pat. No. 11,252,198) which was filed on Sep. 11, 2019. U.S. patent application Ser. No. 16/567,504 is a continuation of U.S. patent application Ser. No. 16/168,273, entitled "Policy-Based Secure Containers for Multiple Enterprise Applications," (now U.S. Pat. No. 10,511,638) which was filed on Oct. 23, 2018. U.S. patent application Ser. No. 16/168,273 is a continuation of U.S. application Ser. No. 15/051,130, entitled "Policy-Based Secure Containers for Multiple Enterprise Applications," (now U.S. Pat. No. 10,122,766) which was filed on Feb. 23, 2016. U.S. application Ser. No. 15/051,130 is a continuation of U.S. application Ser. No. 13/729,586, entitled "Policy-Based Secure Containers for Multiple Enterprise Applications," (now U.S. Pat. No. 9,276,963) which was filed on Dec. 28, 2012. U.S. patent application Ser. No. 16/567,504; U.S. patent application Ser. No. 16/168,273; U.S. patent application Ser. No. 15/051,130; and U.S. patent application Ser. No. 13/729,586 and hereby incorporated herein by reference in their entireties. Priority to U.S. patent application Ser. No. 16/567,504; U.S. patent application Ser. No. 16/168,273; U.S. patent application Ser. No. 15/051,130; and U.S. patent application Ser. No. 13/729,586 is hereby claimed.

BACKGROUND

Enterprises increasingly rely on enterprise applications to allow their users (e.g., employees) to access enterprise information and processes. In turn, users execute such enterprise applications on an increasing number and variety of client computing devices. Such client computing devices vary widely; some may be standardized, enterprise-issued devices, and others may be personally owned consumer devices such as personal smartphones, tablets, or laptop computers. Additionally the method of application development, delivery, and consumption varies between native applications, web based applications, software as a service, HTML 5 and hybrid applications.

To facilitate use of such consumer devices in the enterprise context, the consumer devices typically must be completely managed by the enterprise or completely unmanaged. Requiring enterprise management of user-owned consumer devices may be inconvenient to users or impractical for enterprise information technology staff, along with presenting other privacy and regulatory issues. However, allowing unmanaged devices access to enterprise networks may compromise security of the enterprise.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
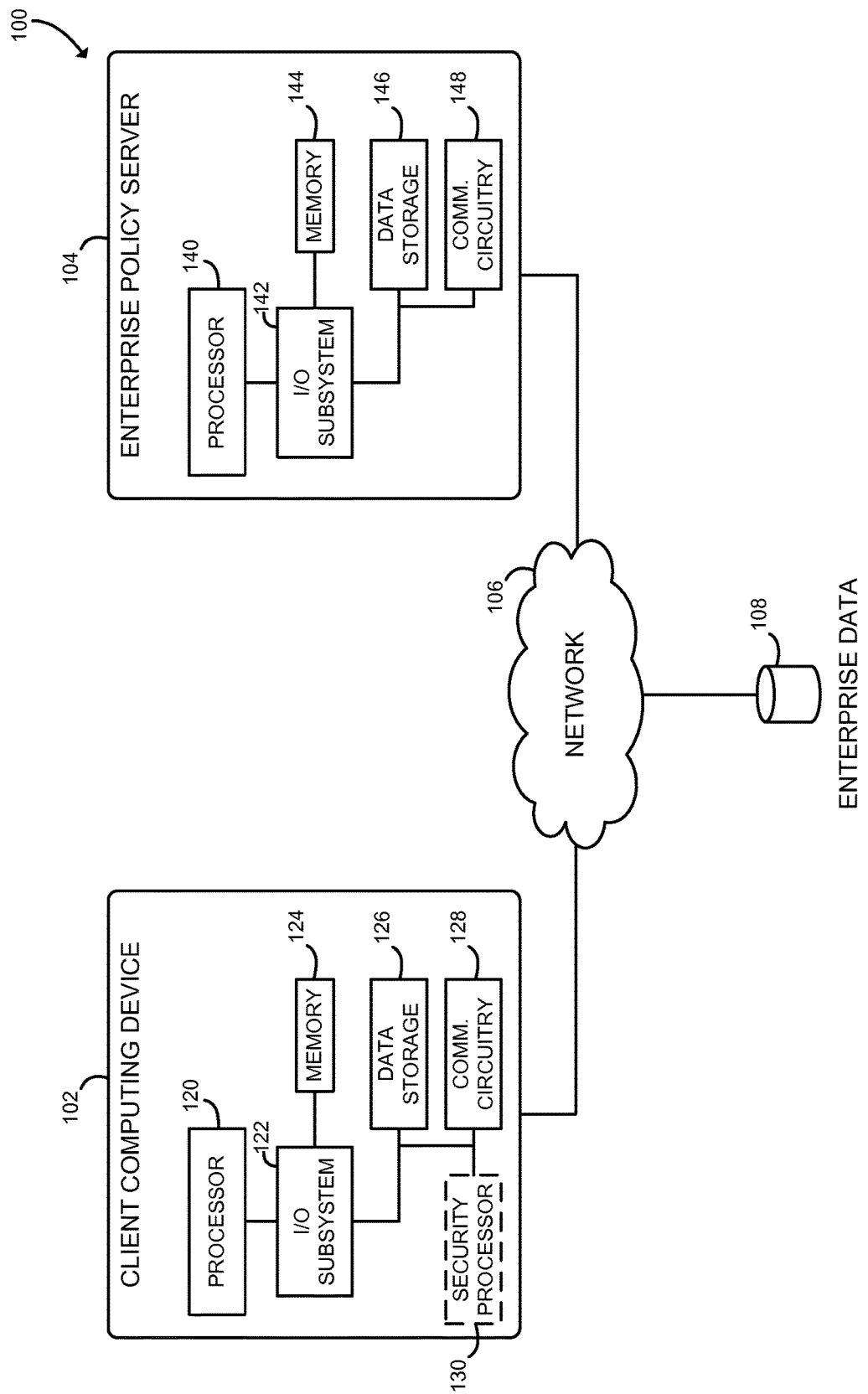
FIG. 1 is a simplified block diagram of at least one embodiment of a system for providing policy-based secure containers for multiple enterprise applications.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for providing policy-based secure containers for multiple enterprise applications includes a client computing device 102 and an enterprise policy server 104 in communication with each other over a network 106. The client computing device 102 and the enterprise policy server 104 may access enterprise data 108 over the network 106. In use, as discussed in more detail below, the client computing device 102 is configured to execute one or more enterprise applications and enforce security policies received from the enterprise policy server 104. The enterprise policy server 104 is configured to provide the security policies to the client computing device 102 based on a trust level associated with the client computing device 102 and a data sensitivity level associated with the particular enterprise application.

The disclosed system and methods allow enterprise security policies to cover multiple enterprise applications sharing information and otherwise working together to accomplish user tasks. By moving policy enforcement to the application level, users may perform tasks using a preferred client computing device 102 while still enforcing enterprise security policies. Access to the enterprise data 108 may be managed according to enterprise policy, without requiring enterprise management of every aspect of the client computing device 102. It should be appreciated that there is a tradeoff between what the enterprise would like to control and the enterprise's practical capabilities. Policy enforcement at the application level provides an alternative model allowing the enterprise to manage content and applications without securing or managing the entire device.

The client computing device 102 may be embodied as any type of device for performing the functions described herein. For example, the client computing device 102 may be embodied as, without limitation, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a consumer electronic device, a digital television device, and/or any other computing device configured to provide policy-based secure containers for multiple enterprise applications. As shown in FIG. 1, the illustrative client computing device 102 includes a processor 120, a memory 124, an input/output subsystem 122, a communication circuit 128, and a data storage device 126. In some embodiments, the client computing device 102 may also include a security processor 130. Of course, the client computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the client computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the client computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the client computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store enterprise applications, security policies, and/or policy-based secure containers. The entire data storage device 126 or a portion of the data storage device 126 may be encrypted. Encryption may be performed in software, in hardware, or in a combination of software and hardware, and in some embodiments may be performed using the security processor 130.

The communication circuit 128 of the client computing device 102 may be embodied as any communication circuit, device, or collection thereof, capable of enabling communications between the client computing device 102, the enterprise policy server 104, the enterprise data 108, and/or other remote devices. The communication circuit 128 may be configured to use any one or more communication technology (e.g., wireless or wired communications) and associated protocols (e.g., Ethernet, Bluetooth WiMAX, etc.) to effect such communication.

The security processor 130 of the client computing device 102 may be embodied as hardware and associated firmware or software configured to enhance the security and/or trustworthiness of the client computing device 102. In some embodiments, the security processor 130 may be embodied as a security co-processor capable of operating independently of the processor 120 (e.g., regardless of the operational state of the processor 120) to provide a secure and isolated environment that cannot be accessed by the processor 120 or other components of the client computing device 102. For example, the security processor 130 may be embodied as a manageability engine ("ME") or an out-of-band processor. In other embodiments, the security processor 130 may be embodied as a trusted hardware component such as a trusted platform module ("TPM"). In some embodiments, the security processor 130 may form part of the I/O subsystem 122. In other embodiments, the security processor 130 may be separate from the client computing device 102 but required to perform the functions described herein (e.g., a cloud based security service).

As discussed in more detail below, the client computing device 102 is configured to transmit and receive data with the other devices of the system 100 over the network 106. The network 106 may be embodied as any number of various wired and/or wireless networks. For example, the network 106 may be embodied as or otherwise include a wired or wireless local area network (LAN), a wired or wireless wide area network (WAN), and/or a publicly-accessible, global network such as the Internet. As such, the network 106 may include any number of additional devices, such as additional computers, routers, and switches, to facilitate communications between the client computing device 102 and the other devices of the system 100.

The enterprise policy server 104 may be embodied as any type of server computing device, or collection of devices, capable of performing the functions described herein. As such, the enterprise policy server 104 may be embodied as a single server computing device or a collection of servers and associated devices. For example, in some embodiments, the enterprise policy server 104 is embodied as a cloud service to perform the functions described herein. In such embodiments, the enterprise policy server 104 may be embodied as a "virtual server" formed from multiple computing devices distributed across the network 106 and operating in a public or private cloud. Accordingly, although the enterprise policy server 104 is illustrated in FIG. 1 and described below as embodied as a single server computing device, it should be appreciated that the enterprise policy server 104 may be embodied as multiple devices cooperating together to facilitate the functionality described below. Illustratively, the enterprise policy server 104 includes a processor 140, an I/O subsystem 142, a memory 144, a data storage 146, a communication circuitry 148, and/or other components and devices commonly found in a computer server or similar computing device. Those individual components of the enterprise policy server 104 may be similar to the corresponding components of the client computing device 102, the description of which is applicable to the corresponding components the enterprise policy server 104 and is not repeated herein so as not to obscure the present disclosure.

The enterprise data 108 represents all data relevant to enterprise applications. As such, the enterprise data 108 may include publicly accessible data such as public web sites, confidential information such as confidential financial information, and sensitive data such as regulated data or trade secrets. The enterprise data 108 is accessible over the network 106 to the client computing device 102 and the enterprise policy server 104. The enterprise data 108 may be embodied as any type of data storage capable of performing the functions described herein, including integrated data storage of one or more enterprise servers, storage area networks, cloud storage systems, or the like. In some embodiments, the enterprise data 108 may be stored in data storage of the enterprise policy server 104.

Figure 2:
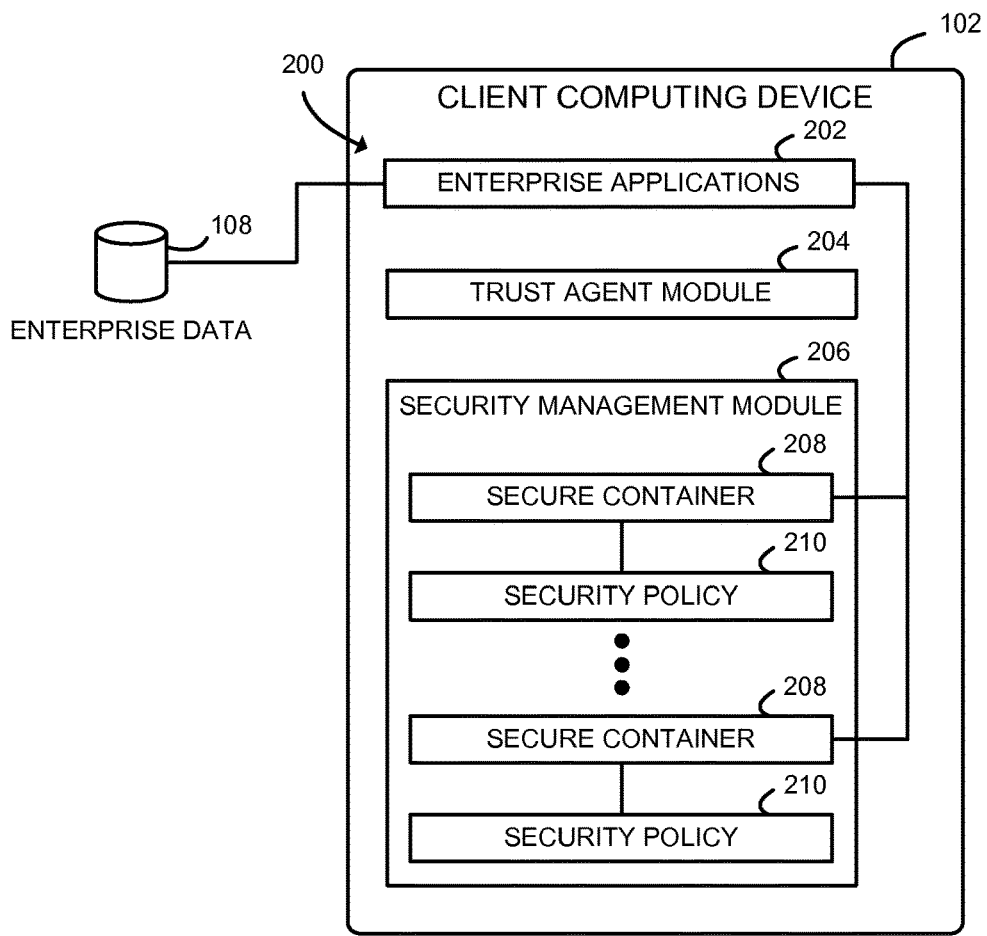
FIG. 2 is a simplified block diagram of at least one embodiment of an environment of a client computing device of the system of FIG. 1.

Referring now to FIG. 2, in an illustrative embodiment, the client computing device 102 establishes an environment 200 during operation. The illustrative environment 200 includes one or more enterprise applications 202, a trust agent module 204, and a security management module 206. The various modules of the environment 200 may be embodied as hardware, firmware, software, or a combination thereof.

The enterprise applications 202 include any application that the user executes to perform enterprise-related tasks, and that may access the enterprise data 108. The enterprise applications 202 may include native applications, applications executed within a runtime environment (e.g., a Java® Runtime Environment ("JRE") or a Common Language Runtime ("CLR")), and web applications. For example, enterprise applications 202 may include custom line-of-business applications, customer relations management applications, and commercial off-the-shelf productivity applications that access enterprise data 108.

The trust agent module 204 is configured to collect device attribute information about the client computing device 102 and send such device attribute information to the enterprise policy server 104. The device attribute information may include any information that identifies or describes the hardware, software, or other environments of the client computing device 102. As described in detail below, such device attribute information is used by the enterprise policy server 104 to determine a device trust level for the client computing device 102. The trust agent module 204 may use features of the security processor 130 to ensure the integrity of the device attribute information.

The security management module 206 is configured to receive security policies 210 from the enterprise policy server 104 and to manage policy-based secure containers 208 for the enterprise applications 202. The security management module 206 manages a group of policy-based secure containers 208, which are sometimes referred to herein as simply "secure containers." Each secure container 208 is associated with a security policy 210 and with one or more of the enterprise applications 202. Each security policy 210 includes a set of rules defining the allowed behavior of the enterprise applications 202 executed in the corresponding secure container 208. As the enterprise applications 202 execute, the secure containers 208 enforce the associated security policy 210. Thus, each secure container 208 is a policy enforcement point. Although the illustrated security management module 206 includes only two secure containers 208, the security management module 206 may include one, two, or more secure containers 208 in other embodiments.

Figure 3:
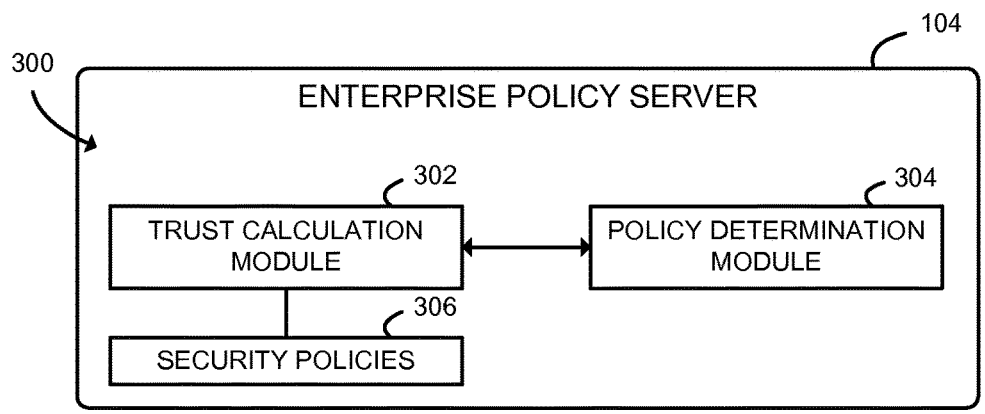
FIG. 3 is a simplified block diagram of at least one embodiment of an environment of an enterprise policy server of the system of FIG. 1.

Referring now to FIG. 3, in one embodiment, the enterprise policy server 104 establishes an environment 300 during operation. The illustrative environment 300 includes a trust calculation module 302, a policy determination module 304, and a plurality of security policies 306. Although illustrated as resident on a single enterprise policy server 104, in some embodiments the trust calculation module 302 and the policy determination module 304 may reside on different server computing device servers. The various modules of the environment 300 may be embodied as hardware, firmware, software, or a combination thereof.

The trust calculation module 302 is configured to receive device attribute information from the client computing device 102 and to calculate a device trust level based on the device attribute information. Such calculation may be performed by, for example, looking up the device trust level in a data table indexed by the device attribute information, calculating the device trust level based on a pre-defined algorithm or function, and/or other device trust level calculation or determination procedures. The various device trust levels may be assigned according to enterprise policy.

The policy determination module 304 is configured to receive a request for access to an enterprise application 202 from the client computing device 102, determine a security policy 210 based on the device trust level and a data sensitivity level associated with the enterprise application 202, and send the security policy 210 to the client computing device 102. Such security policy 210 may be selected from the plurality of security policies 306, which are predefined according to enterprise policy. In some embodiments, the plurality of security policies 306 may be applicable across the entire enterprise. In other embodiments, the plurality of security policies 306 may be specific to the enterprise data 108 or to one or more particular subsets of the enterprise data 108. In some embodiments, the plurality of security policies 306 may be defined dynamically or at runtime.

Figure 4:
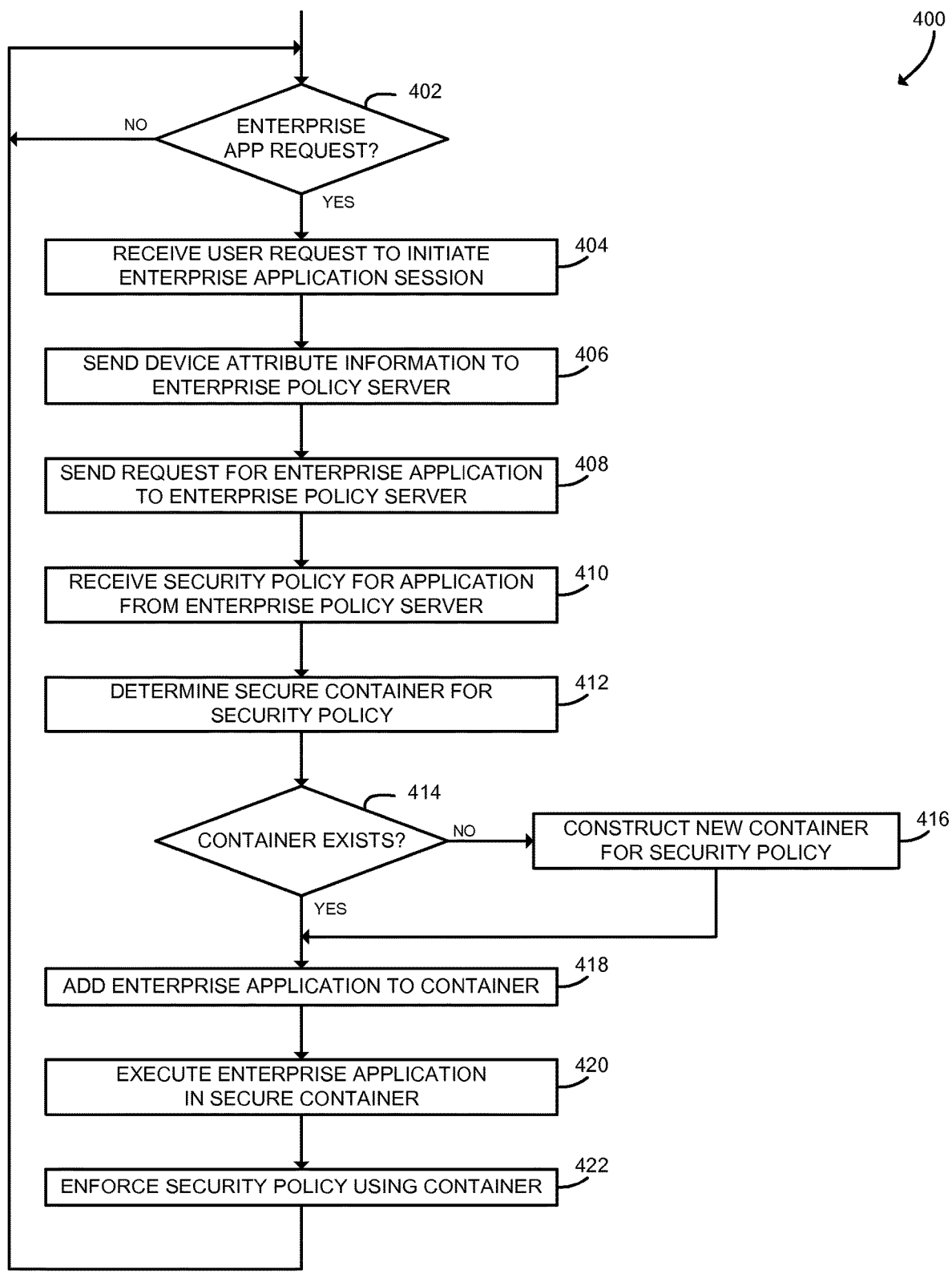
FIG. 4 is a simplified flow diagram of at least one embodiment of a method for providing policy-based secure containers for multiple enterprise applications that may be executed by the client computing device of FIGS. 1 and 2.

Referring now to FIG. 4, in use, the client computing device 102 may execute a method 400 for providing policy-based secure containers for multiple enterprise applications. In block 402, the client computing device 102 determines whether a request for access to an enterprise application session has been received from the user. Such request may occur as the user begins a work session using the enterprise application 202. In some embodiments, such request may occur prior to the user work session, for example when an enterprise application 202 is installed on or otherwise provisioned to the client computing device 102. If no enterprise application request is received, the method 400 loops back to block 402 to continue monitoring for application requests. If, however, an enterprise application request is received, the method 400 advances to block 404.

In block 404, the client computing device 102 receives the request from the user to initiate an enterprise application session. Such request may identify the enterprise application 202 that the user wishes to execute. As discussed above, the enterprise application 202 is executed by the user to accomplish enterprise-related tasks, and may access the enterprise data 108. In some embodiments, the request to initiate the enterprise application session may be embodied as a standard method for invoking an application on the client computing device 102, such as selecting an icon or selecting an item from a menu. Therefore, the user may access the enterprise application 202 using a single action that is consistent with the native user experience of the client computing device 102.

In block 406, the client computing device 102 sends device attribute information to the enterprise policy server 104. As discussed above, the device attribute information may include any information identifying or describing the hardware of the client computing device 102, the operating system of the client computing device 102, and/or other software environment of the client computing device 102. For example, the device attribute information may include information describing an International Mobile Station Equipment Identity ("MEI," used to identify certain mobile communication devices) associated with the client computing device 102, the device type of the client computing device 102 (e.g., computer, tablet, handset, etc.), the operating system installed on the client computing device 102, the particular version of the operating system, the serial number of the client computing device 102, whether the client computing device 102 is managed by a mobile device management system, whether the user of the client computing device 102 has privileged control of the operating system (i.e. "root" access), and/or whether the computing device 102 includes a security processor 130. As described in detail below, the enterprise policy server 104 determines the trust level for the client computing device 102 based on the supplied device attribute information. Other device attribute information may include the network transport(s) available to the client computing device 102, the location of the client computing device 102, and the identity and version of software installed on the client computing device 102. Although illustrated as being sent during every execution of the method 400, in some embodiments, the device attribute information may be sent to the enterprise policy server 104 a single time, which may occur prior to the enterprise application request. In such embodiments, the client computing device 102 may send identifying information to associate with the device attribute information already sent.

As described above, the trust agent module 204 may use features of the security processor 130 to ensure the integrity of the device attribute information. For example, the trust agent module 204 may employ code signing or other cryptographic techniques supported by the security processor 130 to ensure that various software components of the client computing device 102 have not been altered. In some embodiments, the trust agent module 204 may execute in a secure or isolated execution environment of the security processor 130. In other embodiments, the security processor 130 may supply trusted measurements of the client computing device 102 or its software environment from which the device attribute information may be derived.

In block 408, the client computing device 102 sends a request to the enterprise policy server 104 for access to the enterprise application 202 requested by the user. The request for access to the enterprise application 202 corresponds to the user request to initiate an application session. The enterprise application 202 may be identified by a name, a globally unique identifier ("GUID"), a uniform resource indicator ("URI"), a uniform resource locator ("URL"), and/or the like. As described in detail below, the enterprise policy server 104 determines a data sensitivity level based on the requested enterprise application 202. Although blocks 406 and 408 are illustrated as executing sequentially, in other embodiments the operations of blocks 406 and 408 may occur in any order or contemporaneously. For example, the device attribute information and the request for access to the enterprise application 202 may be sent to the enterprise policy server 104 in the same request.

In block 410, the client computing device 102 receives a security policy 210 from the enterprise policy server 104. As described above, the security policy 210 includes a set of rules controlling the behavior of the enterprise application 202. The security policy 210 may include rules governing authentication, data encryption, interprocess communication, logging, auditing, and/or the like.

Figure 5:
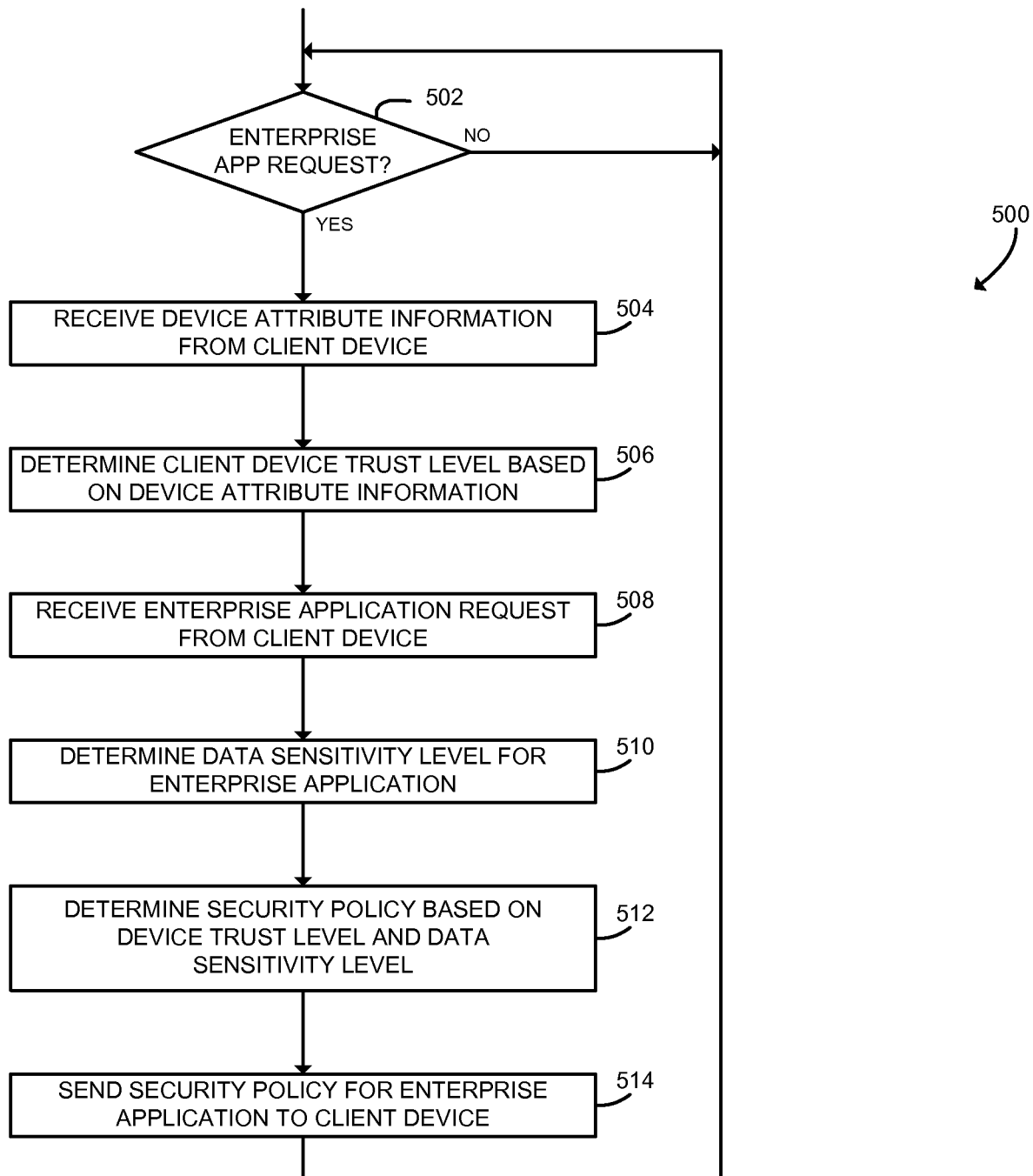
FIG. 5 is a simplified flow diagram of at least one embodiment of a method for providing policy-based secure containers for multiple enterprise applications that may be executed by the enterprise policy server of FIGS. 1 and 3.
Figure 6:
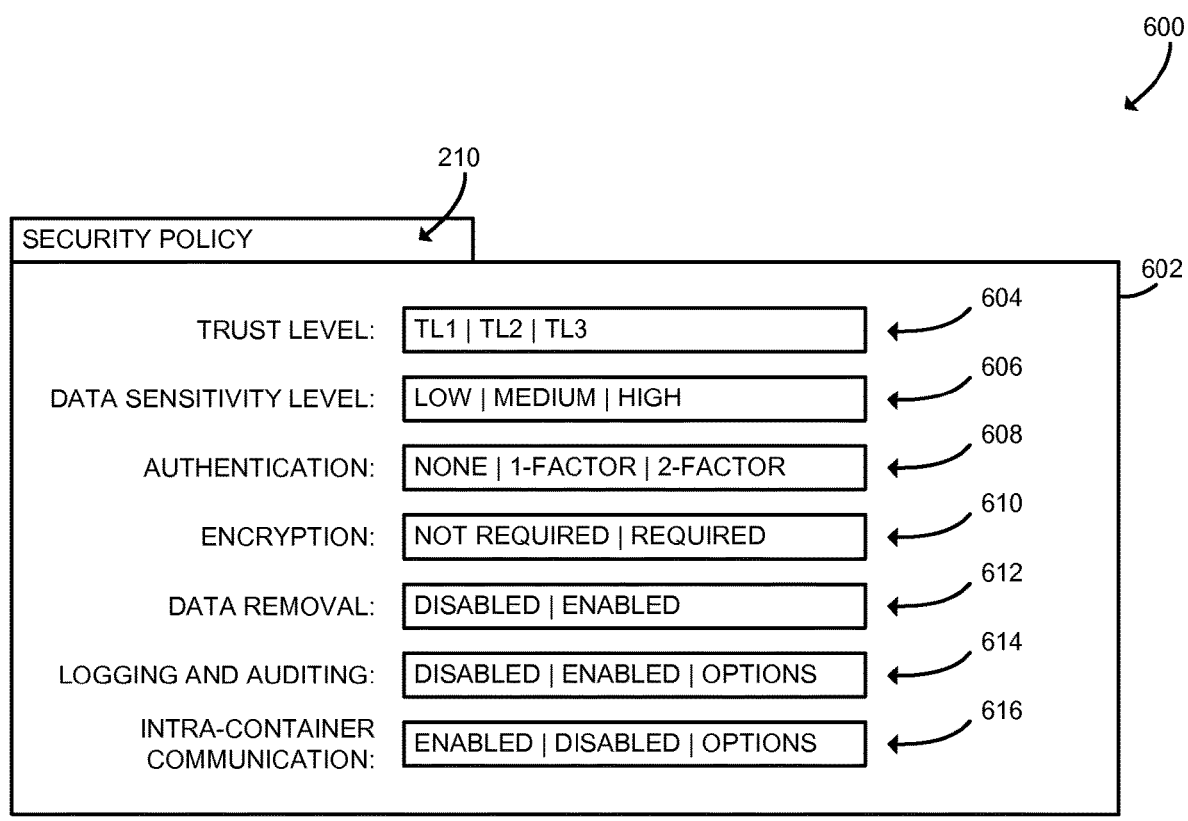
FIG. 6 is a simplified block diagram of at least one embodiment of security policy schema of the environments of FIGS. 2 and 3.

For example, referring to FIG. 6, a block diagram 600 illustrates one possible security policy schema 602. The security policy schema 602 defines attributes, rules, and associated values that may be assigned to a security policy 210. The illustrative schema 602 includes a device trust level 604 and a data sensitivity level 606, which are described in detail below with respect to the FIG. 5 and the enterprise policy server 104. The schema 602 also includes illustrative rules 608, 610, 612, 614, 616. Illustrative rule 608 defines the required authentication method, specifying potential authentication methods of no authentication, one-factor authentication, or two-factor authentication. That is, in some embodiments, multi-factor authentication may be required. Illustrative rule 610 defines whether encryption is required for application data or not. Illustrative rule 612 defines whether application data must be removed after the application exits or not. Illustrative rule 614 defines whether logging and auditing is required or not, and may define logging and auditing options. Illustrative rule 616 defines whether communication is allowed between applications of the same security policy 210 or not, and may define communication options specifying particular communications to allow or disallow (e.g., encrypted communications, network connections, shared memory, cut and paste, etc.). The security policy 210 may include additional or different rules from those illustrated in schema 602.

Referring back to FIG. 4, in block 412, the client computing device 102 determines a policy-based secure container 208 for the received security policy 210. To make such determination, the client computing device 102 compares the trust level and data sensitivity level assigned to the security policy 210 to other security policies 210 for existing secure containers 208. In some embodiments, the client computing device 102 also compares rules of the security policy 210 to rules of the other security policies 210. The client computing device 102 may find a matching secure container 208 among the existing secure containers 208. If not, the client computing device 102 determines that a secure container 208 must be created for the security policy 210. As such, in block 414, the client computing device 102 determines whether a secure container 208 currently exists for the newly received security policy. If so, the method 400 advances to block 418. However, if no secure container 208 currently exists for the newly received security policy, the method 400 advances to block 416 in which the client computing device 102 constructs a new secure container 208 for the newly received security policy 210. The newly constructed secure container 208 is associated to the security policy 210. After constructing the secure container 208, the method 400 advances to block 418.

In block 418, the client computing device 102 adds the enterprise application 202 to the secure container 208. Such secure container 208 may be pre-existing as determined in block 412 or newly constructed in block 416. By adding the enterprise application 202 to the secure container 208, the client computing device 102 establishes a session for the enterprise application 202. Where the secure container 208 is pre-existing, the enterprise application 202 is therefore added to a preexisting session.

In some embodiments, as discussed above, the enterprise application 202 may be previously installed on the client computing device 102. In other embodiments, the client computing device 102 may receive the enterprise application 202 from the enterprise policy server 104. In other embodiments, the client computing device 102 may download the enterprise application 202 from a remote server other than the enterprise policy server 104, for example a web server or a centralized application repository (i.e. an "app store").

In block 420, the client computing device 102 executes the enterprise application 202 in the secure container 208. In some embodiments, the secure container 208 may be implemented as a native application of the client computing device 102 that provides security and auditing services to the enterprise application 202. Such security and auditing services may include secure communication, authentication, and event logging. For example, the secure container 208 may provide an application programming interface ("API") for such security and auditing services, and the enterprise application 202 may be designed to interface with the API of the secure container 208. In such embodiments, the enterprise application 202 may be specially compiled and/or packaged to execute in the secure container 208. Such packaging may include encrypting the enterprise application 202 and/or its associated data. At runtime, the secure container 208 "wraps" the enterprise application 202—that is, the enterprise application 202 requests enterprise data 108 and communicates with other applications by invoking the secure container 208, which handles those requests and communication. In some embodiments, the enterprise application 202 may further be executed in a secure execution environment, which may be provided using the security processor 130.

In other embodiments, the secure container 208 replaces or abstracts services typically provided by an operating system of the client computing device 102. For example, in some embodiments, the secure container 208 is implemented as a shim that intercepts system calls made by the enterprise application 202, performs security and auditing services, and then passes the calls to the operating system of the client computing device 102 (as specified by the security policy 210). Such embodiments may not require any modifications to the enterprise application 202 particular to the secure container 208, allowing the use of commercial or off-the-shelf applications not specifically designed for use with the secure container 208. Such embodiments of the secure container 208 may require special permission or integration with the operating system of the client computing device 102. In some embodiments, the secure container 208 may use security or auditing features provided by the client computing device 102 and thus may not require special permission or integration with the operating system.

As described above, in some embodiments, the enterprise application 202 may execute in a runtime environment of the client computing device 102, such as an interpreted runtime environment or a just-in-time compiled runtime environment. Accordingly, the secure container 208 may be embodied as such a runtime environment of the client computing device 102, or as an extension of such runtime environment. As with native applications, the enterprise application 202 may be designed to invoke an API of the secure container 208, or the secure container 208 may transparently intercept and handle calls to the runtime environment.

Also as described above, in some embodiments, the enterprise application 202 may be a web application. In such embodiments, the secure container 208 may include a web browser environment. For example, the secure container 208 may embed a standard web browser control provided by the client computing device 102, or may include a custom or standalone web browser environment. The enterprise application 202 executes in the web browser environment of the secure container 208. As with native and runtime environment applications, the enterprise application 202 may be designed to invoke an API that the secure container 208 provides through the web browser environment, or the secure container 208 may transparently intercept and handle calls to the web browser environment.

As described above, the secure container 208 may contain one or more enterprise applications 202. Such enterprise applications may be of different types. That is, the secure container 208 may contain any combination of native applications, runtime applications, and web applications.

In block 422, the client computing device 102 enforces the security policy 210 using the secure container 208. As described above, the secure container 208 is configured to evaluate actions of the enterprise application 202 and perform operations as specified in the security policy 210. For example, enforcing the security policy 210 may prevent the enterprise application 202 from communicating with other applications or entities running outside of the secure container 208. The client computing device 102 may, however, allow secure communication among enterprise applications 202 executing within the same secure container 208. The client computing device 102 may enforce authentication requirements of the security policy 210 prior to allowing access to the enterprise application 202. Because a single session is shared for each secure container 208, the client computing device 102 may enforce authentication requirements for each secure container 208 and not for each enterprise application 202, meaning that additional authentication may not be required for an enterprise application 202 added to an already-existing secure container 208. The security policy 210 may define a session time limit, after which time limit has expired the user is required to reauthenticate. In some embodiments, the client computing device 102 may require the user to authenticate to an enterprise authentication server (not illustrated). Additionally or alternatively, the client computing device 102 may encrypt data stored or accessed by the enterprise application 202. The client computing device 102 may also delete data stored by the enterprise application 202 after the enterprise application 202 exits. The client computing device 102 may log events performed by the enterprise application 202 for auditing purposes. In some embodiments, the client computing device 102 may deny access to the enterprise application 202 altogether, based on the security policy 210. After block 422, the method 400 loops back to block 402 to receive additional user requests for enterprise application sessions. Thus, multiple enterprise applications 202 may be requested, added, and executed in the secure container 208.

Referring now to FIG. 5, in use, the enterprise policy server 104 may execute a method 500 for providing secure containers for multiple enterprise applications 202. The method 500 begins with block 502, in which the enterprise policy server 104 monitors for a request from the client computing device 102 for access to an enterprise application session. As described above with relation to block 402, such request may result from a user of the client computing device 102 initiating a work session, or from an enterprise application 202 being installed on or otherwise provisioned to the client computing device 102. If no enterprise application request is received, the method 500 continues to monitor for requests at block 502. If an enterprise application request is received, the method 500 advances to block 504.

In block 504, the enterprise policy server 104 receives device attribute information from the client computing device 102. As described above with respect to block 406, the device attribute information may be embodied as, or otherwise include, any information identifying or describing the hardware of the client computing device 102, the operating system of the client computing device 102, and/or other software environment of the client computing device 102. The client computing device 102 may send the device attribute information in response to a user request for access to an enterprise application 202. In other embodiments, the client computing device 102 may send the device attribute information prior to the enterprise application request. In such embodiments, the enterprise policy server 104 may store the device attribute information until the enterprise application request is received.

In block 506, the enterprise policy server 104 determines a client device trust level for the client computing device 102, based on the device attribute information. To perform this trust level calculation, the enterprise policy server 104 may reference a table of trust levels indexed by device attribute information. For example, a client computing device 102 running a recent version of the iOS® operating system in conjunction with a mobile device management service may be assigned a high trust level (i.e., level "TL3"). A client computing device 102 running a registered version of the Android™ operating system may be assigned a medium trust level (i.e., level "TL2"). A client computing device 102 running an unknown or unregistered operating system may be assigned a low, default trust level (i.e., level "TL1"). The device trust level may depend on other device attribute information, including IMEI, device type, serial number, mobile device management status, whether the user has root access, and the like. Such device trust level assignments may be predefined according to enterprise policy.

In block 508, the enterprise policy server 104 receives a request for access to an enterprise application 202 from the client computing device 102. As described above with respect to block 408, such request may identify the enterprise application 202 by name, globally unique identifier ("GUID"), uniform resource identifier ("URI"), uniform resource locator ("URL"), or the like. The enterprise policy server 104 identifies the requested enterprise application 202 based on data in the request. Although illustrated as being executed sequentially, the operations of blocks 504 and 508 may be executed in any order or contemporaneously. For example, the enterprise policy server 104 may receive the device attribute information and the enterprise application request in the same communication from the client computing device 102.

In block 510, the enterprise policy server 104 determines a data sensitivity level for the requested enterprise application 202. The enterprise data 108 is pre-classified and each subset of the enterprise data 108 is pre-associated to a particular data sensitivity level according to enterprise policy. The enterprise policy server 104 determines what subset of the enterprise data 108 may be accessed by the enterprise application 202, and looks up the associated data sensitivity level for this enterprise data 108. For example, publicly-accessible information may have a low sensitivity level, confidential corporate information, e.g., financial or product information may have a medium sensitivity level, and sensitive content, e.g., regulated content may have a high sensitivity level.

In block 512, the enterprise policy server 104 determines a security policy 210 based on the device trust level and the data sensitivity level. Each security policy 210 included in the plurality of security policies 306 includes a particular trust level and data sensitivity level. The enterprise policy server 104 may search the plurality of security policies 306 for a security policy 210 with matching device trust level and data sensitivity level. For example, referring to FIG. 6, the illustrative security policy schema 602 includes device trust level 604 and data sensitivity level 606. The device trust level 604 has potential values TL1, TL2, and TL3. The data sensitivity level 606 has potential values low, medium, and high. Accordingly, assuming the device trust level is determined to be TL3 and the data sensitivity level is determined to be high, the enterprise policy server 104 searches the plurality of security policies 306 for a security policy 210 having device trust level TL3 and data sensitivity level high. The security policy 210 includes a set of rules controlling the behavior of the enterprise application 202, as described above with respect to block 410 of FIG. 4. As described above, in other embodiments, the enterprise policy server 104 may derive a security policy 210 at runtime, based on the device trust level 604 and the data sensitivity level 606.

Referring back to FIG. 5, in block 514, the enterprise policy server 104 sends the security policy 210 to the client computing device 102. In some embodiments, the enterprise policy server 104 may also send the enterprise application 202 to the client computing device 102. As described above, the client computing device 102 references or creates a secure container 208 for the security policy 210, executes the enterprise application 202, and enforces the security policy 210. After sending the security policy 210, the method 500 loops back to block 502 to wait for additional enterprise application requests.

EXAMPLES

Example 1 includes a client computing device for applying enterprise policies to applications. The client computing device includes a trust agent module to send device attribute information that identifies attributes of the client computing device to an enterprise policy server; and a security management module to send a request for an enterprise application to the enterprise policy server in response to receiving a user request for a session with the enterprise application; receive a security policy for the enterprise application from the enterprise policy server in response to sending the device attribute information and the request for access to the enterprise application; determine whether a secure container exists on the client computing device for the security policy; construct the secure container on the client computing device for the security policy in response to determining the secure container does not exist; and add the enterprise application to the secure container; wherein the secure container is to enforce the security policy while the enterprise application is executed on the client computing device.

Example 2 includes the subject matter of Example 1, and wherein the security management module comprises a security management module further to receive the enterprise application from the enterprise policy server.

Example 3 includes the subject matter of any of Examples 1 and 2, and wherein the security policy comprises a security policy to allow the enterprise application to securely communicate with other enterprise applications in the secure container; and prevent the enterprise application from communicating with applications not in the secure container.

Example 4 includes the subject matter of any of Examples 1-3, and wherein the security policy comprises a security policy to require a user of the client computing device to authenticate prior to execution of the enterprise application.

Example 5 includes the subject matter of any of Examples 1-4, and wherein the security policy comprises a security policy to require the user to perform one-factor authentication prior to execution of the enterprise application.

Example 6 includes the subject matter of any of Examples 1-5, and wherein the security policy comprises a security policy to require the user to perform multi-factor authentication prior to execution of the enterprise application.

Example 7 includes the subject matter of any of Examples 1-6, and wherein the security policy comprises a security policy to require the user to authenticate for the secure container.

Example 8 includes the subject matter of any of Examples 1-7, and wherein the security policy comprises a security policy to require the user to authenticate for the secure container without requiring the user to authenticate for the enterprise application of the secure container.

Example 9 includes the subject matter of any of Examples 1-8, and wherein the security policy comprises a security policy to require the user to reauthenticate after a session time limit has expired.

Example 10 includes the subject matter of any of Examples 1-9, and wherein the security policy comprises a security policy to encrypt data accessed or stored by the enterprise application.

Example 11 includes the subject matter of any of Examples 1-10, and wherein the security policy comprises a security policy to remove data created by the enterprise application when the enterprise application terminates.

Example 12 includes the subject matter of any of Examples 1-11, and wherein the security policy comprises a security policy to log activities of the enterprise application.

Example 13 includes the subject matter of any of Examples 1-12, and wherein the device attribute information comprises at least one of an international mobile station equipment identity ("IMEI") identifier of the client computing device; a device type identifier of the client computing device; an operating system identifier of the client computing device; an operating system version identifier of the client computing device; a serial number identifier of the client computing device; a mobile device management identifier of the client computing device, the mobile device management identifier indicating whether the client computing device is managed by a mobile device management system of the enterprise; or a root access indicator of the client computing device, the root access indicator indicating whether a user of the client computing device has privileged control of an operating system of the client computing device.

Example 14 includes the subject matter of any of Examples 1-13, and wherein the enterprise application comprises one of a native application of the client computing device; an application in a runtime environment of the client computing device; or a web application in a web browser environment of the client computing device.

Example 15 includes an enterprise policy server to determine enterprise security policies for a client computing device. The enterprise policy server includes a trust calculation module to receive device attribute information that identifies attributes of the client computing device; and determine a device trust level for the client computing device based on the device attribute information; and a policy determination module to receive a request for an enterprise application from the client computing device; determine a data sensitivity level based on the enterprise application; determine a security policy based on the device trust level and the data sensitivity level; and send the security policy to the client computing device.

Example 16 includes the subject matter of Example 15, and wherein the policy determination module comprises a policy determination module to select the data sensitivity level from a plurality of predefined data sensitivity levels associated with enterprise data that can be accessed by the enterprise application.

Example 17 includes the subject matter of any of Examples 15 and 16, and further including a plurality of predefined security policies, wherein the policy determination module comprises a policy determination module to select the security policy from the plurality of predefined security policies based on the device trust level and the data sensitivity level.

Example 18 includes the subject matter of any of Examples 15-17, and wherein the policy determination module comprises a policy determination module to send the enterprise application to the client computing device.

Example 19 includes the subject matter of any of Examples 15-18, and wherein the enterprise application comprises one of a native application of the client computing device; an application for a runtime environment of the client computing device; or a web application for a web browser environment of the client computing device.

Example 20 includes the subject matter of any of Examples 15-19, and wherein the security policy comprises a security policy to allow the enterprise application to securely communicate with other enterprise applications associated with the security policy; and prevent the enterprise application from communicating with applications not associated with the security policy.

Example 21 includes the subject matter of any of Examples 15-20, and wherein the security policy comprises a security policy to require a user of the client computing device to authenticate prior to execution of the enterprise application.

Example 22 includes the subject matter of any of Examples 15-21, and wherein the security policy comprises a security policy to require the user to perform one-factor authentication prior to execution of the enterprise application.

Example 23 includes the subject matter of any of Examples 15-22, and wherein the security policy comprises a security policy to require the user to perform multi-factor authentication prior to execution of the enterprise application.

Example 24 includes the subject matter of any of Examples 15-23, and wherein the security policy comprises a security policy to require the user to reauthenticate after a session time limit has expired.

Example 25 includes the subject matter of any of Examples 15-24, and wherein the security policy comprises a security policy to require the client computing device to encrypt data accessed or stored by the enterprise application.

Example 26 includes the subject matter of any of Examples 15-25, and wherein the security policy comprises a security policy to require the client computing device to remove data created by the enterprise application when the enterprise application terminates.

Example 27 includes the subject matter of any of Examples 15-26, and wherein the security policy comprises a security policy to require the client computing device to log activities of the enterprise application.

Example 28 includes the subject matter of any of Examples 15-27, and wherein the device attribute information comprises at least one of an international mobile station equipment identity ("IMEI") identifier of the client computing device; a device type identifier of the client computing device; an operating system identifier of the client computing device; an operating system version identifier of the client computing device; a serial number identifier of the client computing device; a mobile device management identifier of the client computing device, the mobile device management identifier indicating whether the client computing device is managed by a mobile device management system of the enterprise; or a root access indicator of the client computing device, the root access indicator indicating whether a user of the client computing device has privileged control of an operating system of the client computing device.

Example 29 includes a method to apply enterprise policies to applications on a client computing device. The method includes sending device attribute information that identifies attributes of the client computing device from the client computing device to an enterprise policy server; sending, from the client computing device, a request for access to an enterprise application to the enterprise policy server; receiving, on the client computing device, a security policy for the enterprise application based on the device attribute information; determining, on the client computing device, whether a secure container exists for the security policy; constructing, on the client computing device, the secure container for the security policy in response to determining the secure container does not exist; adding, on the client computing device, the enterprise application to the secure container; executing, on the client computing device, the enterprise application; and enforcing, on the client computing device, the security policy while the enterprise application is executed on the client computing device.

Example 30 includes the subject matter of Example 29, and further including receiving, on the client computing device, the enterprise application from the enterprise policy server.

Example 31 includes the subject matter of any of Examples 29 and 30, and wherein enforcing the security policy comprises allowing the enterprise application to securely communicate with other enterprise applications in the secure container; and preventing the enterprise application from communicating with applications not in the secure container.

Example 32 includes the subject matter of any of Examples 29-31, and wherein enforcing the security policy comprises requiring a user of the client computing device to authenticate prior to execution of the enterprise application.

Example 33 includes the subject matter of any of Examples 29-32, and wherein requiring the user to authenticate comprises requiring the user to perform one-factor authentication prior to execution of the enterprise application.

Example 34 includes the subject matter of any of Examples 29-33, and wherein requiring the user to authenticate comprises requiring the user to perform multi-factor authentication prior to execution of the enterprise application.

Example 35 includes the subject matter of any of Examples 29-34, and wherein requiring the user to authenticate comprises requiring the user to authenticate for the secure container.

Example 36 includes the subject matter of any of Examples 29-35, and wherein requiring the user to authenticate for the secure container comprises requiring the user to authenticate for the secure container without requiring the user to authenticate for the enterprise application of the secure container.

Example 37 includes the subject matter of any of Examples 29-36, and wherein enforcing the security policy further comprises requiring the user to reauthenticate after a session time limit has expired.

Example 38 includes the subject matter of any of Examples 29-37, and wherein enforcing the security policy comprises encrypting data accessed or stored by the enterprise application.

Example 39 includes the subject matter of any of Examples 29-38, and wherein enforcing the security policy comprises removing data created by the enterprise application when the enterprise application terminates.

Example 40 includes the subject matter of any of Examples 29-39, and wherein enforcing the security policy comprises logging activities of the enterprise application.

Example 41 includes the subject matter of any of Examples 29-40, and wherein sending the device attribute information comprises sending at least one of an international mobile station equipment identity ("IMEI") identifier of the client computing device; a device type identifier of the client computing device; an operating system identifier of the client computing device; an operating system version identifier of the client computing device; a serial number identifier of the client computing device; a mobile device management identifier of the client computing device, the mobile device management identifier indicating whether the client computing device is managed by a mobile device management system of the enterprise; or a root access indicator of the client computing device, the root access indicator indicating whether a user of the client computing device has privileged control of an operating system of the client computing device.

Example 42 includes the subject matter of any of Examples 29-41, and wherein executing the enterprise application comprises executing one of a native application of the client computing device; an application in a runtime environment of the client computing device; or a web application in a web browser environment of the client computing device.

Example 43 includes a method to determine enterprise security policies for a client computing device. The method includes receiving, on an enterprise policy server, device attribute information that identifies attributes of the client computing device; determining, on the enterprise policy server, a device trust level for the client computing device based on the device attribute information; receiving, on the enterprise policy server, a request for access to an enterprise application from the client computing device; determining, on the enterprise policy server, a data sensitivity level based on the requested enterprise application; determining, on the enterprise policy server, a security policy based on the device trust level and the data sensitivity level; and sending, from the enterprise policy server, the security policy to the client computing device.

Example 44 includes the subject matter of Example 43, and wherein determining the data sensitivity level comprises selecting the data sensitivity level from a plurality of predefined data sensitivity levels associated with enterprise data that can be accessed by the requested enterprise application.

Example 45 includes the subject matter of any of Examples 43 and 44, and wherein determining the security policy comprises selecting the security policy from a plurality of predefined security policies based on the device trust level and the data sensitivity level.

Example 46 includes the subject matter of any of Examples 43-45, and further including sending the enterprise application from the enterprise policy server to the client computing device.

Example 47 includes the subject matter of any of Examples 43-46, and wherein sending the enterprise application comprises sending one of a native application of the client computing device; an application for a runtime environment of the client computing device; or a web application for a web browser environment of the client computing device.

Example 48 includes the subject matter of any of Examples 43-47, and wherein determining the security policy comprises determining a security policy that allows the enterprise application to securely communicate with other enterprise applications associated with the security policy; and preventing the enterprise application from communicating with applications not associated with the security policy.

Example 49 includes the subject matter of any of Examples 43-48, and wherein determining the security policy comprises determining a security policy that requires a user of the client computing device to authenticate prior to execution of the enterprise application.

Example 50 includes the subject matter of any of Examples 43-49, and wherein determining the security policy comprises determining a security policy that requires the user to perform one-factor authentication prior to execution of the enterprise application.

Example 51 includes the subject matter of any of Examples 43-50, and wherein determining the security policy comprises determining a security policy that requires the user to perform multi-factor authentication prior to execution of the enterprise application.

Example 52 includes the subject matter of any of Examples 43-51, and wherein determining the security policy comprises determining a security policy that requires the user to reauthenticate after a session time limit has expired.

Example 53 includes the subject matter of any of Examples 43-52, and wherein determining the security policy comprises determining a security policy that requires the client computing device to encrypt data accessed or stored by the enterprise application.

Example 54 includes the subject matter of any of Examples 43-53 and wherein determining the security policy comprises determining a security policy that requires the client computing device to remove data created by the enterprise application when the enterprise application terminates.

Example 55 includes the subject matter of any of Examples 43-54, and wherein determining the security policy comprises determining a security policy that requires the client computing device to log activities of the enterprise application.

Example 56 includes the subject matter of any of Examples 43-55, and wherein receiving the device attribute information comprises receiving at least one of an international mobile station equipment identity ("IMEI") identifier of the client computing device; a device type identifier of the client computing device; an operating system identifier of the client computing device; an operating system version identifier of the client computing device; a serial number identifier of the client computing device; a mobile device management identifier of the client computing device, the mobile device management identifier indicating whether the client computing device is managed by a mobile device management system of the enterprise; or a root access indicator of the client computing device, the root access indicator indicating whether a user of the client computing device has privileged control of an operating system of the client computing device.

Example 57 includes a computing device having a processor; and a memory having stored therein a plurality of instructions that when executed by the processor cause the computing device to perform the method of any of Examples 29-56.

Example 58 includes one or more machine readable storage media comprising a plurality of instructions stored thereon that in response to being executed result in a computing device performing the method of any of Examples 29-56.

Example 59 includes a client computing device to apply enterprise policies to applications. The client computing device includes means for sending device attribute information that identifies attributes of the client computing device from the client computing device to an enterprise policy server; means for sending, from the client computing device, a request for access to an enterprise application to the enterprise policy server; means for receiving, on the client computing device, a security policy for the enterprise application based on the device attribute information; means for determining, on the client computing device, whether a secure container exists for the security policy; means for constructing, on the client computing device, the secure container for the security policy in response to determining the secure container does not exist; means for adding, on the client computing device, the enterprise application to the secure container; means for executing, on the client computing device, the enterprise application; and means for enforcing, on the client computing device, the security policy while the enterprise application is executed on the client computing device.

Example 60 includes the subject matter of Example 59, and further including means for receiving, on the client computing device, the enterprise application from the enterprise policy server.

Example 61 includes the subject matter of any of Examples 59 and 60, and wherein the means for enforcing the security policy comprises means for allowing the enterprise application to securely communicate with other enterprise applications in the secure container; and means for preventing the enterprise application from communicating with applications not in the secure container.

Example 62 includes the subject matter of any of Examples 59-61, and wherein the means for enforcing the security policy comprises means for requiring a user of the client computing device to authenticate prior to execution of the enterprise application.

Example 63 includes the subject matter of any of Examples 59-62, and wherein the means for requiring the user to authenticate comprises means for requiring the user to perform one-factor authentication prior to execution of the enterprise application.

Example 64 includes the subject matter of any of Examples 59-63, and wherein the means for requiring the user to authenticate comprises means for requiring the user to perform multi-factor authentication prior to execution of the enterprise application.

Example 65 includes the subject matter of any of Examples 59-64, and wherein the means for requiring the user to authenticate comprises means for requiring the user to authenticate for the secure container.

Example 66 includes the subject matter of any of Examples 59-65, and wherein the means for requiring the user to authenticate for the secure container comprises means for requiring the user to authenticate for the secure container without requiring the user to authenticate for the enterprise application of the secure container.

Example 67 includes the subject matter of any of Examples 59-66, and wherein the means for enforcing the security policy further comprises means for requiring the user to reauthenticate after a session time limit has expired.

Example 68 includes the subject matter of any of Examples 59-67, and wherein the means for enforcing the security policy comprises means for encrypting data accessed or stored by the enterprise application.

Example 69 includes the subject matter of any of Examples 59-68, and wherein the means for enforcing the security policy comprises means for removing data created by the enterprise application when the enterprise application terminates.

Example 70 includes the subject matter of any of Examples 59-69, and wherein the means for enforcing the security policy comprises means for logging activities of the enterprise application.

Example 71 includes the subject matter of any of Examples 59-70, and wherein the means for sending the device attribute information comprises means for sending at least one of an international mobile station equipment identity ("IMEI") identifier of the client computing device; a device type identifier of the client computing device; an operating system identifier of the client computing device; an operating system version identifier of the client computing device; a serial number identifier of the client computing device; a mobile device management identifier of the client computing device, the mobile device management identifier indicating whether the client computing device is managed by a mobile device management system of the enterprise; or a root access indicator of the client computing device, the root access indicator indicating whether a user of the client computing device has privileged control of an operating system of the client computing device.

Example 72 includes the subject matter of any of Examples 59-71, and wherein the means for executing the enterprise application comprises means for executing one of a native application of the client computing device; an application in a runtime environment of the client computing device; or a web application in a web browser environment of the client computing device.

Example 73 includes an enterprise policy server to determine enterprise security policies for a client computing device. The enterprise policy server includes means for receiving, on an enterprise policy server, device attribute information that identifies attributes of the client computing device; means for determining, on the enterprise policy server, a device trust level for the client computing device based on the device attribute information; means for receiving, on the enterprise policy server, a request for access to an enterprise application from the client computing device; means for determining, on the enterprise policy server, a data sensitivity level based on the requested enterprise application; means for determining, on the enterprise policy server, a security policy based on the device trust level and the data sensitivity level; and means for sending, from the enterprise policy server, the security policy to the client computing device.

Example 74 includes the subject matter of Example 73, and wherein the means for determining the data sensitivity level comprises means for selecting the data sensitivity level from a plurality of predefined data sensitivity levels associated with enterprise data that can be accessed by the requested enterprise application.

Example 75 includes the subject matter of any of Examples 73 and 74, and wherein the means for determining the security policy comprises means for selecting the security policy from a plurality of predefined security policies based on the device trust level and the data sensitivity level.

Example 76 includes the subject matter of any of Examples 73-75, and further including means for sending the enterprise application from the enterprise policy server to the client computing device.

Example 77 includes the subject matter of any of Examples 73-76, and wherein the means for sending the enterprise application comprises means for sending one of a native application of the client computing device; an application for a runtime environment of the client computing device; or a web application for a web browser environment of the client computing device.

Example 78 includes the subject matter of any of Examples 73-77, and wherein the means for determining the security policy comprises means for determining a security policy that allows the enterprise application to securely communicate with other enterprise applications associated with the security policy; and means for preventing the enterprise application from communicating with applications not associated with the security policy.

Example 79 includes the subject matter of any of Examples 73-78, and wherein the means for determining the security policy comprises means for determining a security policy that requires a user of the client computing device to authenticate prior to execution of the enterprise application.

Example 80 includes the subject matter of any of Examples 73-79, and wherein the means for determining the security policy comprises means for determining a security policy that requires the user to perform one-factor authentication prior to execution of the enterprise application.

Example 81 includes the subject matter of any of Examples 73-80, and wherein the means for determining the security policy comprises means for determining a security policy that requires the user to perform multi-factor authentication prior to execution of the enterprise application.

Example 82 includes the subject matter of any of Examples 73-81, and wherein the means for determining the security policy comprises means for determining a security policy that requires the user to reauthenticate after a session time limit has expired.

Example 83 includes the subject matter of any of Examples 73-82, and wherein the means for determining the security policy comprises means for determining a security policy that requires the client computing device to encrypt data accessed or stored by the enterprise application.

Example 84 includes the subject matter of any of Examples 73-83 and wherein the means for determining the security policy comprises means for determining a security policy that requires the client computing device to remove data created by the enterprise application when the enterprise application terminates.

Example 85 includes the subject matter of any of Examples 73-84, and wherein the means for determining the security policy comprises means for determining a security policy that requires the client computing device to log activities of the enterprise application.

Example 86 includes the subject matter of any of Examples 73-85, and wherein the means for receiving the device attribute information comprises means for receiving at least one of an international mobile station equipment identity ("IMEI") identifier of the client computing device; a device type identifier of the client computing device; an operating system identifier of the client computing device; an operating system version identifier of the client computing device; a serial number identifier of the client computing device; a mobile device management identifier of the client computing device, the mobile device management identifier indicating whether the client computing device is managed by a mobile device management system of the enterprise; or a root access indicator of the client computing device, the root access indicator indicating whether a user of the client computing device has privileged control of an operating system of the client computing device.

The invention claimed is:

1. A client compute device comprising:
memory;
instructions; and
processor circuitry to execute the instructions to:
after a request to access an enterprise application, cause transmission of information indicative of an operating system of the client compute device to a server, the server to evaluate trustworthiness of the client compute device based on the information, the enterprise application to provide controlled access to enterprise data;
access a policy from the server, the policy to include a set of rules for control of behavior of the enterprise application;
construct a secure container on the client compute device; and
cause execution of the enterprise application in the secure container, the secure container to enforce the policy while the enterprise application is executed on the client compute device.

2. The client compute device of claim 1, wherein the set of rules includes a rule indicating whether to allow one or more network connections, and the secure container is to cause the client compute device to:
based on the rule, allow the enterprise application to securely communicate with another enterprise application via a first network connection; and
based on the rule, prevent the enterprise application from communicating with an application via a second network connection.

3. The client compute device of claim 1, wherein the secure container is to cause the client compute device to require a user of the client compute device to authenticate prior to execution of the enterprise application.

4. The client compute device of claim 1, wherein the secure container is to cause the client compute device to:
encrypt data accessed or stored by the enterprise application; or
remove data created by the enterprise application when the enterprise application terminates.

5. The client compute device of claim 1, wherein the secure container is to cause the client compute device to log activities of the enterprise application.

6. A method comprising:
after a request to access an enterprise application, transmitting information indicative of an operating system of a client compute device to a server, the server to evaluate trustworthiness of the client compute device based on the information, the enterprise application to provide controlled access to enterprise data;
obtaining, by executing an instruction with processor circuitry of the client compute device, a policy from the server, the policy to include a set of rules for the control of behavior of the enterprise application;
initiating, by executing an instruction with the processor circuitry, a secure container on the client compute device; and
executing, with the processor circuitry, the enterprise application in the secure container, the secure container to enforce the policy while the enterprise application is executed on the client compute device.

7. The method of claim 6, wherein the set of rules includes a rule indicating whether to allow one or more network connections, and the method further includes:
based on the rule, allowing the enterprise application to securely communicate with another enterprise application via first network connection; and
based on the rule, preventing the enterprise application from communicating with an application via a second network connection.

8. The method of claim 6, further including requiring a user of the client compute device to authenticate prior to execution of the enterprise application.

9. The method of claim 6, further including:
encrypting data accessed or stored by the enterprise application; or
removing data created by the enterprise application when the enterprise application terminates.

10. One or more storage devices or storage disks comprising instructions that, when executed, cause a client compute device to:
after a request to access an enterprise application, cause transmission of information indicative of an operating system of the client compute device to a server, the server to evaluate trustworthiness of the client compute device based on the information, the enterprise application to provide controlled access to enterprise data;

access a policy from the server, the policy to include a set of rules for control of behavior of the enterprise application;

deploy a secure container on the client compute device; and cause execution of the enterprise application in the secure container, the secure container to enforce the policy while the enterprise application is executed on the client compute device.

11. The one or more storage devices or storage disks of claim 10, wherein the set of rules includes a rule indicating whether to allow one or more network connections, and the instructions cause the client compute device to:

based on the rule, allow the enterprise application to securely communicate with other another enterprise application via a first network connection; and based on the rule, prevent the enterprise application from communicating with an application via a second network connection.

12. The one or more storage devices or storage disks of claim 10, wherein the instructions cause the client compute device to require a user of the client compute device to authenticate prior to execution of the enterprise application.

13. The one or more storage devices or storage disks of claim 10, wherein the instructions cause the client compute device to:

encrypt data accessed or stored by the enterprise application; or remove data created by the enterprise application when the enterprise application terminates.

14. The one or more storage devices or storage disks of claim 10, wherein the instructions cause the client compute device to require the client compute device to log activities of the enterprise application.

15. The client compute device of claim 1, wherein the information is first information, and the processor circuitry is to cause transmission of second information to the server, the second information indicative of a version of the operating system of the client compute device.

16. The client compute device of claim 1, wherein the information is first information, and the processor circuitry is to cause transmission of second information to the server, the second information indicative of a physical attribute of the client compute device, the physical attribute including a location of the client compute device.

17. The one or more storage devices or storage disks of claim 10, wherein the information is first information, and the instructions cause the client compute device to cause transmission of second information to the server, the second information indicative of a version of the operating system of the client compute device.

18. The one or more storage devices or storage disks of claim 10, wherein the information is first information, and the instructions cause the client compute device to cause transmission of second information to the server, the second information indicative of a physical attribute of the client compute device, the physical attribute including a location of the client compute device.

19. A system comprising:
a server; and
a client compute device to:
after a request to access an enterprise application, cause transmission of information indicative of an operating system of the client compute device to the server, the server to evaluate trustworthiness of the client compute device based on the information, the enterprise application to provide controlled access to enterprise data;

access a policy from the server, the policy to include a set of rules for control of behavior of the enterprise application;

construct a secure container on the client compute device; and cause execution of the enterprise application in the secure container, the secure container to enforce the policy while the enterprise application is executed on the client compute device.

20. The system of claim 19, wherein the information is first information, and the client compute device is to cause transmission of second information to the server, the second information indicative of a version of the operating system of the client compute device.

21. The system of claim 19, wherein the information is first information, and the client compute device is to cause transmission of second information to the server, the second information indicative of a physical attribute of the client compute device, the physical attribute including a location of the client compute device.

22. The system of claim 19, wherein the set of rules includes a rule indicating whether to allow one or more network connections, and the secure container is to cause the client compute device to:

based on the rule, allow the enterprise application to securely communicate with another enterprise application via a first network connection; and based on the rule, prevent the enterprise application from communicating with an application via a second network connection.

23. The system of claim 19, wherein the secure container is to cause the client compute device to require a user of the client compute device to authenticate prior to execution of the enterprise application.

24. The system of claim 19, wherein the secure container is to cause the client compute device to:

encrypt data accessed or stored by the enterprise application; or remove data created by the enterprise application when the enterprise application terminates.

25. The system of claim 19, wherein the secure container is to cause the client compute device to log activities of the enterprise application.

* * * * *